United States Patent
Dziekan et al.

(10) Patent No.: US 12,041,984 B2
(45) Date of Patent: Jul. 23, 2024

(54) PADDING MATERIALS FOR PROTECTIVE PRODUCTS AND METHODS OF PRODUCING THE SAME

(71) Applicant: Purdue Research Foundation, West Lafayette, IN (US)

(72) Inventors: Michael J. Dziekan, Park Ridge, IL (US); Eric A. Nauman, West Lafayette, IN (US); Kevin G. McIver, Lafayette, IN (US); Nicolas Leiva-Molano, Lafayette, IN (US); Jacob McGough, Battle Ground, IN (US); Sean Bucherl, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 92 days.

(21) Appl. No.: 17/246,109

(22) Filed: Apr. 30, 2021

(65) Prior Publication Data
US 2021/0337890 A1 Nov. 4, 2021

Related U.S. Application Data

(60) Provisional application No. 63/019,020, filed on May 1, 2020.

(51) Int. Cl.
*A41D 13/015* (2006.01)
*A41D 13/05* (2006.01)
(Continued)

(52) U.S. Cl.
CPC ............ *A41D 13/015* (2013.01); *A41D 13/05* (2013.01); *B32B 3/30* (2013.01); *F16F 7/121* (2013.01);
(Continued)

(58) Field of Classification Search
CPC ........ A41D 13/015; A41D 13/05; B32B 3/26; B32B 3/30; B32B 5/022; B32B 5/145;
(Continued)

(56) References Cited

U.S. PATENT DOCUMENTS 5,274,846 A * 1/1994 Kolsky ................. F16F 1/3737
428/313.5
6,110,982 A * 8/2000 Russick ..................... C08J 9/04
521/97
(Continued)

FOREIGN PATENT DOCUMENTS

WO WO-2012125589 A2 * 9/2012 ......... A41D 19/0065
WO WO-2012142524 A1 * 10/2012 ............. B32B 3/263

OTHER PUBLICATIONS

Poron(R) Microcellular Urethane. Obtained from the Stockwell Elastomerics website on Nov. 15, 2022. (Year: 2022).*

*Primary Examiner* — Megha M Gaitonde
(74) *Attorney, Agent, or Firm* — Hartman Global IP Law; Gary M. Hartman; Domenica N. S. Hartman (57) ABSTRACT

Padding materials capable of use as or incorporation into protective products, and methods of producing such padding materials. The padding material includes a base and an array of raised unit cells that individually protrude from a surface of the base so that the unit cells are spaced apart from each other. The base and the unit cells are formed of a cured polymeric material that contains fine porosity, and a substrate formed of a textile or fabric material is embedded in the base and permeated by the cured polymeric material.

20 Claims, 5 Drawing Sheets

(51) Int. Cl.
  *B32B 3/30* (2006.01)
  *F16F 7/12* (2006.01)
(52) U.S. Cl.
  CPC . *B32B 2260/021* (2013.01); *Y10T 428/24479* (2015.01)
(58) Field of Classification Search
  CPC ........... B32B 5/18; B32B 5/245; B32B 5/265; B32B 5/28; B32B 2260/021; B32B 2260/046; F16F 7/121; Y10T 428/24479; Y10T 428/24174; Y10T 428/24496; Y10T 428/24504; Y10T 428/24603; Y10T 428/24612; Y10T 428/2495
  USPC ................ 428/156, 158, 159, 172, 212, 213
  See application file for complete search history.

(56) References Cited

U.S. PATENT DOCUMENTS

| | | |
|---|---|---|
| 9,056,983 B2 | 6/2015 | Nauman et al. |
| 9,394,959 B2 | 7/2016 | Nauman et al. |
| 9,839,250 B2 | 12/2017 | Nauman et al. |
| 10,183,423 B2 | 1/2019 | Nauman et al. |
| 2015/0082523 A1* | 3/2015 | Wyner ..................... B32B 7/12 2/455 |

* cited by examiner

PADDING MATERIALS FOR PROTECTIVE PRODUCTS AND METHODS OF PRODUCING THE SAME

CROSS-REFERENCE TO RELATED APPLICATIONS

This application claims the benefit of U.S. Provisional Application No. 63/019,020, filed May 1, 2020, the contents of which are incorporated herein by reference.

BACKGROUND OF THE INVENTION

The present invention generally relates to materials capable of energy absorption to offer protection from impacts, etc. The invention particularly relates to padding materials that include an array of shock absorbing surface features integrated into and protruding from a substrate, and are capable of being used as or incorporated into various protective equipment and products.

Protective garments, gear, and equipment are commonly used in sports that have high rates of contact between players and/or other objects such as balls or the ground, and are intended to mitigate possible injuries, abrasion burns, cuts and bruises experienced in sporting activities. Examples of such protective products include helmets and garments that are worn by individuals and incorporate padding to protect the head, shoulders, elbows, thighs, knees, tail bones, etc., and are commonly used in sports such as American football, rugby, basketball, and others. Other examples of protective products include padding that can be applied to or incorporated into surfaces and equipment to protect individuals in case of a collision therewith.

Protective padding has also been incorporated into fabrics that are capable of contouring to the skin and can be directly worn over the skin without the need for compression layers or materials. Commercial examples of this type of padding, sometimes referred to as adhesive second skins or adhesive second skins, include "Defender" (Donjoy Performance) and the HEX® Skin Roll (McDavid Inc.). Second skin products are appealing because they can be worn over any area in the body, customized to fit joints and complex geometries, and affixed to the skin without the need of a sleeve or a specialized piece of equipment. Padding may be in the form of hexagonal-shaped cells having a thickness of about 4 mm to about 4.5 mm. However, the padding of existing second skin products has not been proven to absorb substantial amounts of energy when compared to unpadded surfaces for short-duration impacts.

Pads, whether incorporated into a second skin product, sewn into a garment, or affixed to a helmet, are often open or closed foam cell materials or gel-like substances. These have characteristic stress-strain curves that attenuate impact energy from collisions, thus protecting its user. However, at high strain rates the performances of these foam cell materials suffer as they rapidly stiffen because their microstructures cannot compress fast enough to attenuate energy, thus reducing their ability to absorb impact energy.

Despite massive investment in current padding technologies, there is an ongoing desire for new materials capable of covering a wider range of the energy absorption spectrum at high strain rates often associated with impacts that occur in sporting activities.

BRIEF DESCRIPTION OF THE INVENTION

The present invention provides padding materials suitable for use as or incorporation into various protective products, and methods of producing such padding materials.

According to one aspect of the invention, a padding material includes a base and an array of raised unit cells that individually protrude from a surface of the base so that the unit cells are spaced apart from each other. The base and the unit cells are formed of a cured polymeric material that contains fine porosity, and a substrate formed of a textile or fabric material is embedded in the base and permeated by the cured polymeric material.

According to another aspect of the invention, a method for producing a padding material includes providing a mold having at least first and second components, filling recesses in the first component with an uncured polymer material, locating a substrate of a textile or fabric material over the recesses of the first component such that the substrate overlies the uncured polymer material, assembling the first component with the second component to enclose the uncured polymeric material and the substrate, generating a vacuum through the second component such that a first portion of the uncured polymer material is siphoned from the recesses in the first component and through the substrate, and curing the uncured polymer material to form a cured polymeric material that is integrated into and permeates the substrate and a second portion of the uncured polymer material remains in the recesses and defines an array of unit cells that protrude from one surface of the substrate.

Technical effects of the padding material and method described above preferably include the ability to produce various protective products with improved shock or impact absorption relative to conventional padded products, including second skin products. In addition, methods for producing the padding material allow for the creation of a matrix of the polymeric material in which the substrate is embedded while enabling at least portions of the embedded substrate between the unit cells to remain breathable, and enabling adhesion and proper placement of the unit cells over the wearers' skin. In addition, sensors may be embedded in the padding material, and polymeric materials of different colors may be used to enable a user to be notified as to when the padding material may require replacement.

Other aspects and advantages of this invention will be appreciated from the following detailed description.

DETAILED DESCRIPTION OF THE INVENTION

The intended purpose of the following detailed description of the invention and the phraseology and terminology employed therein is to describe what is shown in the drawings, which include the depiction of one or more nonlimiting embodiments of the invention, and to describe certain but not all aspects of the embodiments depicted in the drawings. The following detailed description also describes certain investigations relating to the embodiments, and identifies certain but not all alternatives of the depicted embodiments. Therefore, the appended claims, and not the detailed description, describe what is believed to be one or more aspects of the invention.

Disclosed herein are padding materials as well as protective products (as nonlimiting examples, garments, gear, equipment, and structural components) that comprise the padding materials. FIGS. 1 through 4 represent various views (not to scale) of nonlimiting embodiments of a padding material 10, which is a composite of at least one polymeric material and at least one substrate. As represented in FIGS. 1 through 4, the polymeric material(s) defines an array of individual protruding surface features, generally in the form of raised pads or islands referred to herein as unit cells 12, that are fixed to and protrude from a base 16 in which the substrate(s) 14, such as one or more textiles or fabrics, is preferably embedded. The substrate 14 may be elastic and breathable (i.e., air-permeable). The unit cells 12 are incorporated into the substrate 14 as a result of the polymeric material that forms the cells 12 permeating at least portions of the substrate 14 to form the base 16 of the padding material 10. The unit cells 12 are intentionally spaced apart from each other, creating voids therebetween. In the nonlimiting embodiment(s) of FIGS. 1 through 4, the unit cells 12 are represented as identical hexagonal prisms arranged in an equi-spaced pattern on the base 16. Notably, the unit cells 12 may be formed to have various other shapes, sizes, or combinations of multiple shapes and sizes, and may have varying spacing therebetween.

The padding materials 10, including its unit cells 12, substrate 14, and base 16, may be formed from various materials. The unit cells 12 are configured to absorb shock for the purpose of reducing the effects of impacts, and the base 16 is configured to mold to, and optionally adhere to, a user's body or a portion of protective gear worn by a user. In preferred embodiments, the unit cells 12 are formed by a cured polymeric material, such as a silicone or another viscoelastic polymer, particularly viscoelastic polymers having curing characteristics that are similar to silicone, for example, in terms of curing temperatures and conditions, curing activators, curing mechanisms, and/or curing agents, etc. The cured polymeric material may contain and in some cases preferably contains one or more additives, as nonlimiting examples, graphite, aluminum powder, sand, carbon nanotubes, and carbon fiber, to tailor the stiffness of the cured polymeric material. Curing of the polymeric material is initiated with one or more activators (catalysts) so that at least the unit cells 12 contain fine (microscopic) porosity. For this purpose, prior to curing air can be introduced into the uncured polymeric material, such as by mixing or stirring, to create air bubbles within the uncured polymeric material. On a micro-level, curing of the uncured polymeric material is conducted to promote migration of the air bubbles within the uncured polymeric material to create the fine porosity within the cured polymeric material. The pore size of the porosity is generally on a microscopic scale (for example, 0.1 micrometers up to and including 100 micrometers) and may vary depending on the local curing rate of the polymeric material, wherein faster curing rates may result in finer porosity and slower curing rates may result in coarser porosity. A mixture of activators can be selected to contain at least two different activators that individually achieve relatively faster and slower curing rates, which may promote the formation of finer and coarser porosity in the cured polymeric material (and, therefore, in at least the unit cells 12), for example, depending on the particular activator that was locally present within regions of the uncured polymer. Preferred embodiments make use of activators that enable shorter cure times of as little as a few minutes and much longer cure times of up to twenty-four hours or more, and different ratios of faster-curing and slower-curing activators may be capable of altering the size distribution of porosity within the padding material 10. In a specific nonlimiting example, the padding material 10 may be produced by mixing graphite (such as a Microfyne graphite from Asbury Graphite; Rodeo, CA) with an uncured RTV silicone (such as a tin-based RTV 1000 silicone rubber from Eager Plastics; Chicago, IL) and initiating curing of the mixture with a ratio-based mix of slow-curing and fast-curing activators (Eager Plastics; Chicago, IL).

Figure 1:
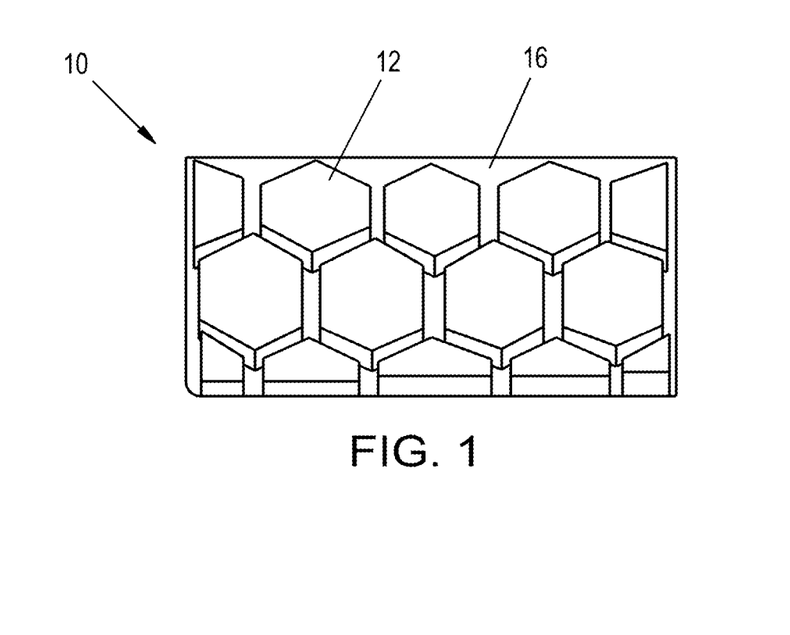
FIGS. 1 through 4 schematically represent various views of padding materials that comprise raised pads (unit cells) in accordance with certain nonlimiting aspects of the invention.
Figure 2:
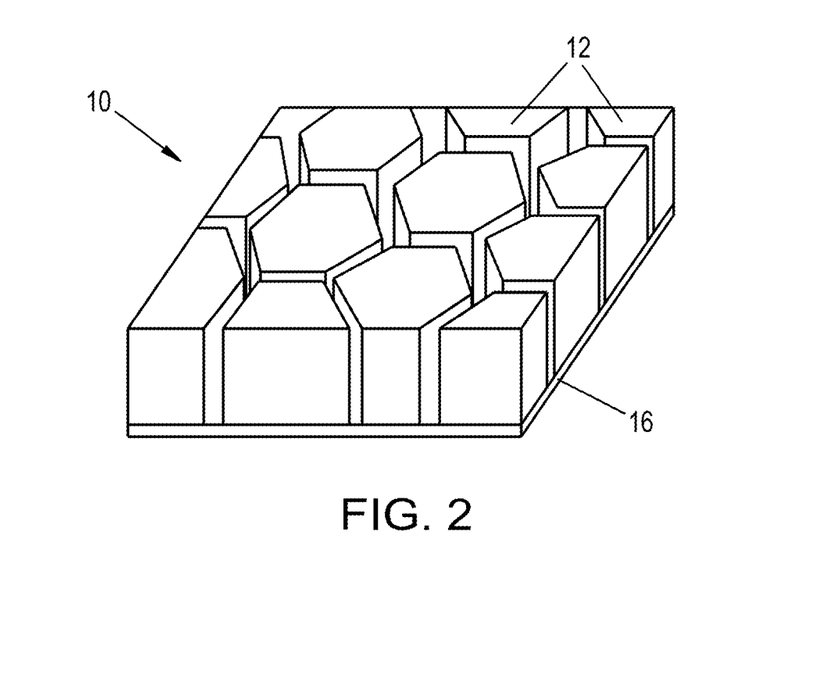
Figure 3:
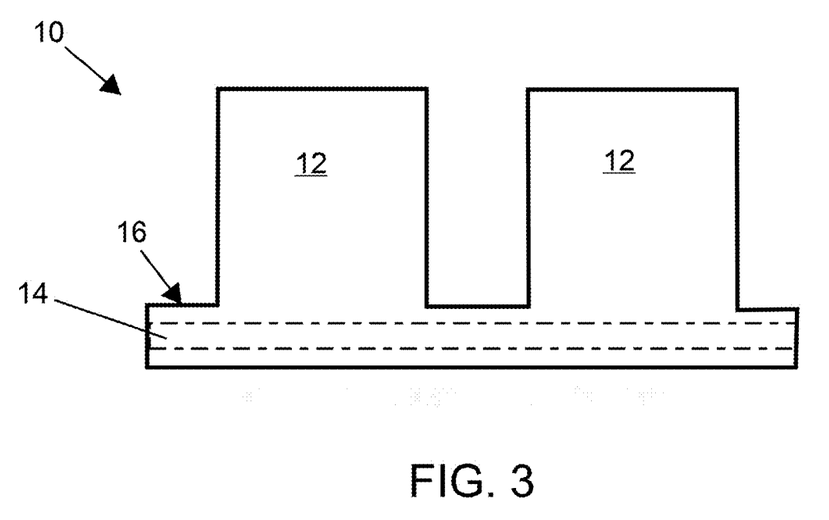
Figure 4:
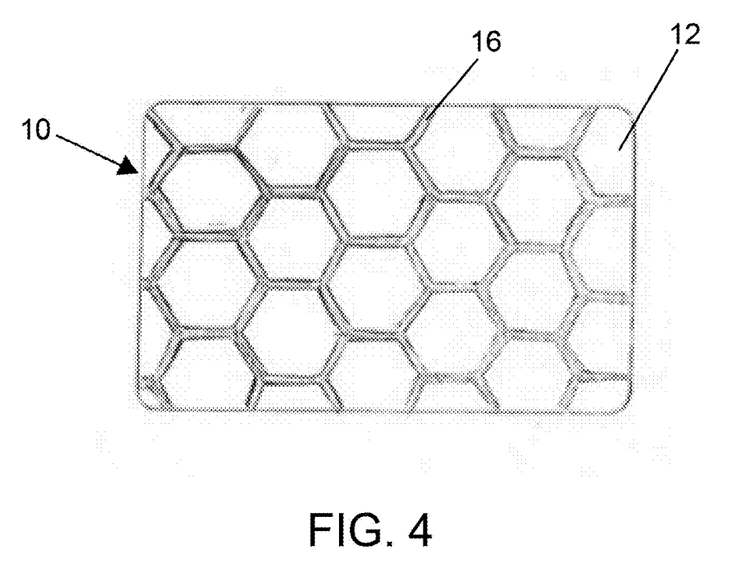

Various methods may be used to produce the padding material 10. For certain embodiments, the padding material 10 is cast using a two-part mold. An outer component of the mold includes recesses configured to produce the unit cells 12, and an inner component of the mold includes a perforated surface has shape will define the surface of the base 16 opposite the cells 12. The uncured polymeric material of the unit cells 12 (e.g., silicone) containing inserted air bubbles is poured into the outer component of the mold so as to fill the recesses, after which the substrate 14 (e.g., fabric or textile) is placed over the uncured polymeric material within the outer component. The inner component of the mold is then aligned and stacked on the outer component to enclose the substrate 14 within the resulting mold cavity, the inner and outer components are clamped together, and a vacuum is drawn at the perforated surface of the inner component to siphon some of the uncured polymeric material from the recesses of the outer component, through the substrate 14, and through the perforated holes of the inner component of the mold. In doing so, the air bubbles within the uncured polymeric material migrate (due to flow of the uncured polymeric material, buoyancy of the bubbles, etc.) and/or expand (due to the reduced (sub-atmospheric) pressure) to create porosity within the polymeric material, wherein the amount, size, and distribution of the pores may vary and may potentially be tailored. For example, the pore size and distribution may vary depending on the local curing rate of the polymeric material, with faster curing rates possibly promoting finer porosity (relatively smaller pores) and slower curing rates possibly promoting coarser porosity (relatively larger pores). In this scenario, both finer and coarser porosity may both be present in the cured polymeric material (and, therefore, within at least the unit cells 12 of the padding material 10), depending on the particular activator that was locally present within regions of the uncured polymeric material. The ratio of fast and slow activators may be adjusted according to the material of the substrate 14. In general, for a substrate 14 having a relatively dense populated thread count, a higher ratio of slow activator is preferred. On a macro-level, the siphoned uncured polymeric material is caused to permeate the substrate 14 and consequently, after curing, is incorporated through the textile/fabric of the substrate 14, with the result that, in addition to the unit cells 12, the cured polymeric material forms the base 16 that serves as a polymeric matrix that contains and embeds the substrate 14, generally as schematically represented in FIG. 3.

Figure 5:
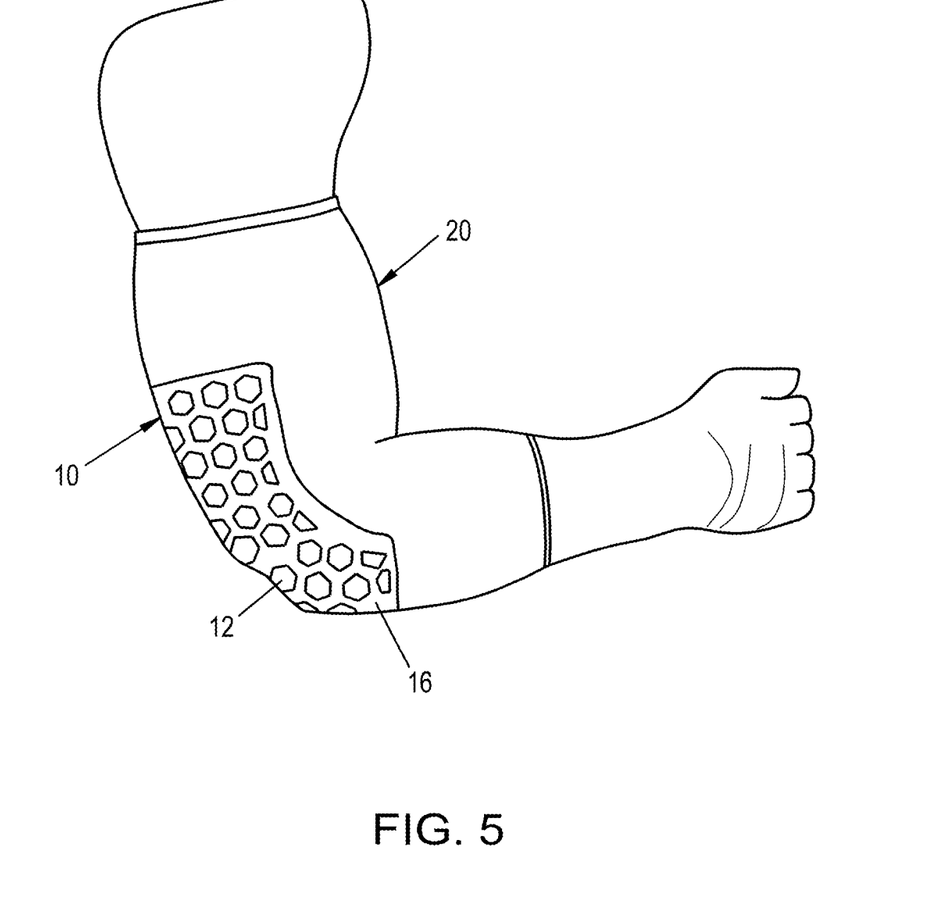
FIG. 5 represents a second skin product in the form of an elastic compression sleeve that is shown being worn on an elbow, and represents the product as incorporating a padding material of a type represented in FIGS. 1 through 4.

Various materials, preferably fabric textiles, may be used for the substrate 14 and may be tailored for the intended application. To produce certain compression products such as sleeves, shirts, leggings, or socks, the substrate 14 may include a woven, elastic, and breathable polyester composite textile such as nylon or lycra (spandex) in combination with cotton or polyester. Such composite textile materials are conventionally used in conjunction with padding to create shoulder pads, thigh pads, and tail-bone pads, typically as two-piece garments in which one or more pads are inserted in a fabric pocket that may be temporarily or permanently sealed. In embodiments in which the substrate 14 is formed of such composite textile materials, the polymeric material permeates through pores of the textile material to fully adhere to the material. As such, a single piece of textile material can be used to manufacture sleeves, shirts, leggings, or socks with integrated padding. As a nonlimiting example, FIG. 5 represents a compression sleeve 20 with integrated padding material 10 on the elbow area.

Figure 6:
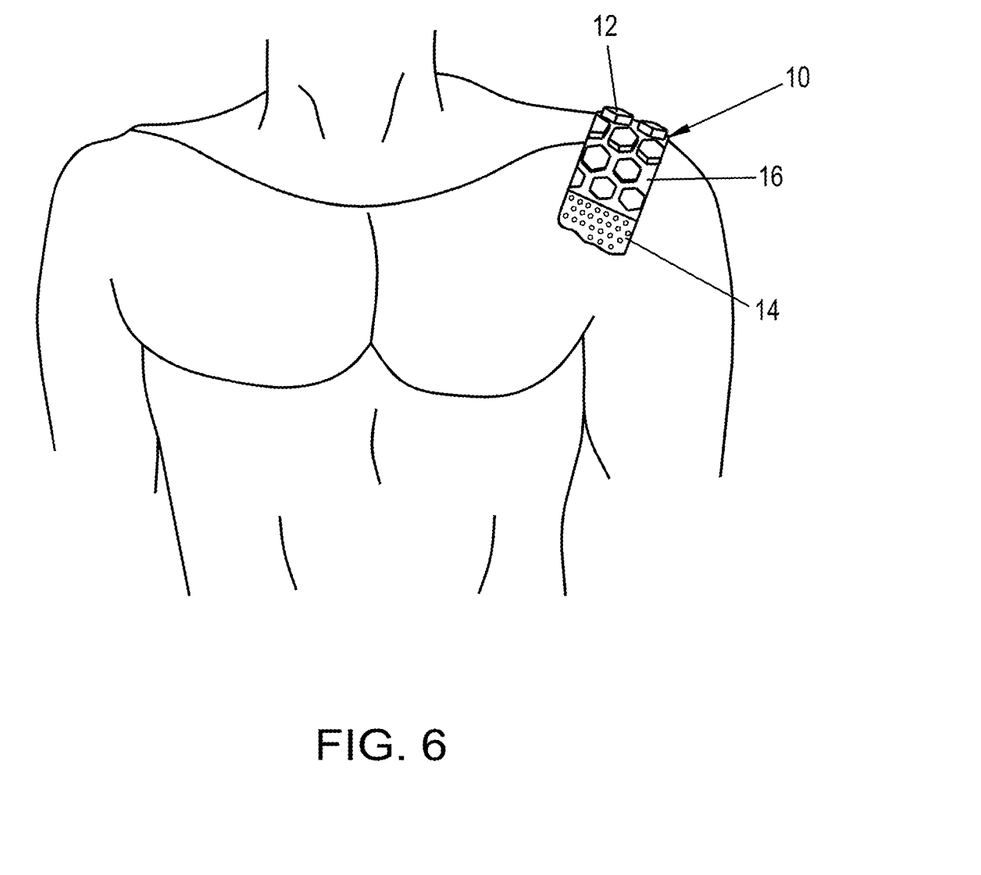
FIG. 6 represents an adhesive second skin product incorporating a padding material of a type represented in FIGS. 1 through 4, with a portion of the padding material omitted to expose an adhesive elastic substrate of the padding material.

To produce certain second skin-type products, the substrate 14 may be an elastic (stretchable) non-woven polyester material with an adhesive surface, commercial examples of which include Cover-Roll® from BSN medical, Inc. This type of material is often used as primary care for wounds because of its breathable and elastic properties. The adhesive surface allows the material to be affixed on the body, regardless of the complexity or the curvature of the surface it is applied to. Utilizing this type of material as the substrate 14 of the padding material 10 allows for the manufacture of rolls of the padding material 10, which can be applied to and worn over almost any area in the body as a second skin-type product that can be customized to fit joints and complex geometries without the need of a sleeve or specific piece of equipment. FIG. 6 schematically represents the padding material 10 as an example of such a second skin-type product adhered to a user's shoulder. A portion of the padding material 10 is omitted to expose the substrate 14, whose adhesive surface may form the surface of the base 16 opposite the unit cells 12.

Protective products that can be produced from or with padding materials 10 as described above may have a wide variety of applications, such as protective garments, gear, and equipment used in sporting activities, surfaces of sporting equipment to protect individuals in case of a collision therewith, playing surfaces such as wood, grass, or turf to provide protection against abrasion burns, cuts and bruises during sporting activities (e.g., volleyball, soccer, football, baseball, and basketball), roll bars and cages in passenger vehicles to protect occupants in the event of a collision, an additional layer of cushioning between an individual and an object being used by the individual (e.g., between a weight lifter and weight equipment), day-to-day protection for individuals (especially infants and older individuals) and surfaces at risk of person-to-object collisions, day-to-day protection for surfaces at risk of object-on-object collisions (e.g., between cabinets, doors, doorframes, doorknobs, walls, and gates, and on floors of weight rooms to protect from damage due to dropped weights), and hard armor plates of Level III and Level IV military body armor to protect the plates from impact and reduce the severity of bruising that can occur when the plates are impacted and fractured. The padding material 10 may also be incorporated into artificial turfs used in sports facilities as a shock pad to improve energy absorption of the ground surface to reduce athlete injuries, and integrated into flooring structures to provide comfort in day-to-day labor applications such as operating rooms and retail stores.

Figure 7:
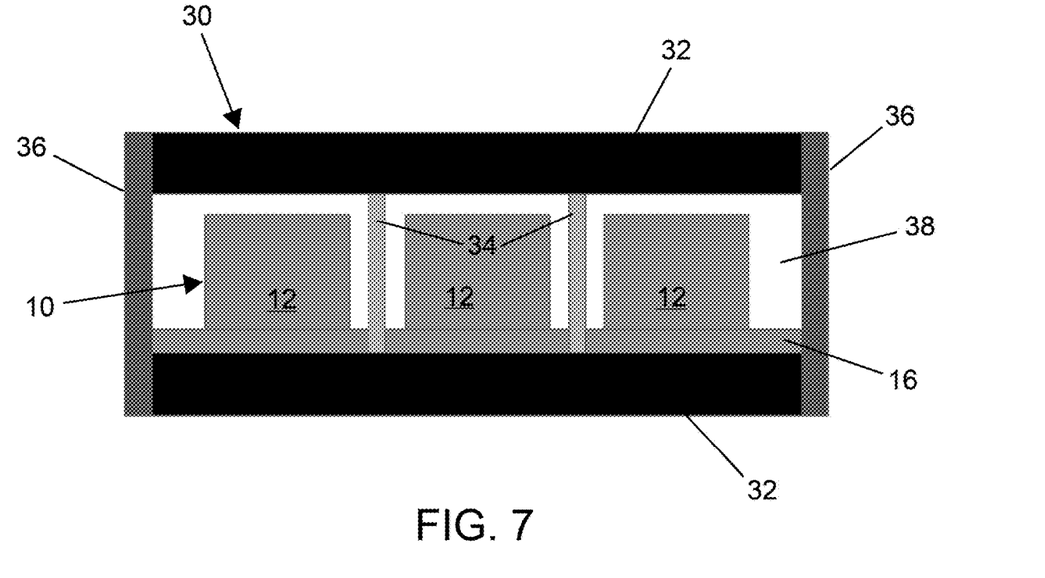
FIGS. 7 and 8 schematically represent cross-sectional and top views, respectively, of a protective product that is adapted as a structural component and incorporates a padding material of a type represented in FIGS. 1 through 4.
Figure 8:
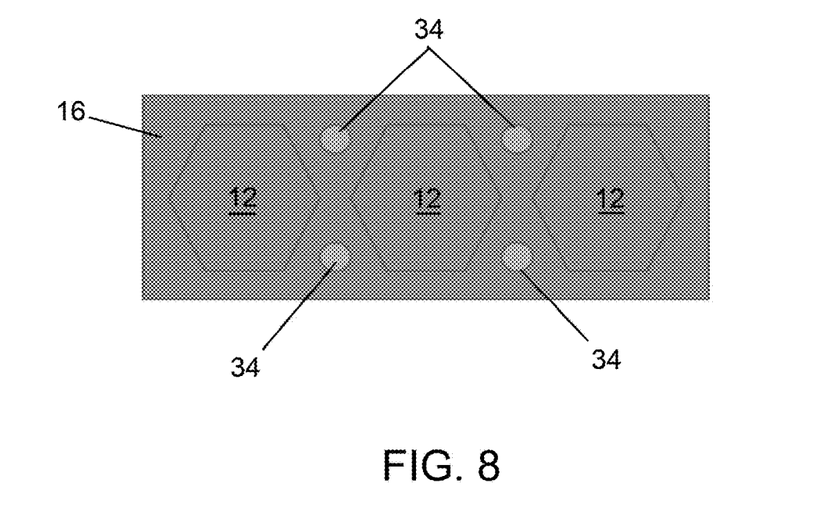

As another particular example of types of protective products that can benefit from the padding material 10, FIGS. 7 and 8 schematically represent a structural component 30 that incorporates the padding material 10. The component 30 may form or form a part of a floorboard or wall of a military vehicle, for example, to reduce blast waves from explosions. In one embodiment, the component 30 may be a drop-in floor liner that can be installed in an existing military vehicle.

FIGS. 7 and 8 schematically represent a cross-sectional side view and a plan view of the component 30, and represent the padding material 10 immersed in a fluid 38 contained within a closed cavity defined by and between two plates 32. The cavity may be further enclosed by sidewalls 36. Additional structural support between the plates 32 is provided with columns or struts 34 or other reinforcement members located between adjacent unit cells 12 of the padding material 10. The spacing between adjacent unit cells 12 creates voids within the cavity that are filled by the fluid 38.

For military vehicle use, the plates 32 will typically be rigid to exhibit minimal deflection during normal use, for example, to support the weight of military personnel wearing full armor. For example, the plates 32 may exhibit less than five percent strain with a load of about 250 kg on a 1 m×1 m area. Variable dimensions of these components could be used to change performance parameters for different vehicles and tune peak blast wave reductions (e.g., for static structures vs. MRAPs vs. tanks). Various materials may be capable of acceptable properties, including wood, metal, or composites such as aramid or carbon fiber composites.

The component 30 is preferably configured so that the fluid 38 (for example, vegetable oil, water, or air) is able to increase the absorbance of peak pressure waves of an explosion. Preferably, the plates 32 prevent the fluid 38 from being expelled from the top and bottom of the component 30 formed by the plates 32. The struts 34 and sidewalls 36 may be formed of the same material as the plates 32, though different polymeric, metal, or composite materials may be more preferable to promote the flow of the fluid 38 between the plates 32 to dissipate energy. In some cases, the struts 34 and/or sidewalls 36 may also be formed of a more elastic material such as silicone or a coated or uncoated fabric textile that may be permeable or impermeable to the fluid 38.

The component 30 may also form or form a part of protective gear worn by military personnel or others who may be exposed to shock waves, in which case it may be desirable to form the plates 32 of a more compliant material to allow the product to conform to a curved surface, such as the shell of a Kevlar helmet.

In investigations leading to the present invention, experimental specimens of the padding material 10 were produced from the aforementioned graphite-silicone mixture (Microfyne graphite from Asbury Graphite and tin-based RTV 1000 silicone rubber from Eager Plastics) incorporating the Cover-Roll® polyester material (from BSN medical, Inc.) as the substrate 14. The experimental specimens were performance tested and compared to specimens of two commercially-available second skin protective products, "Defender" (Donjoy Performance) and the HEX® Skin Roll (McDavid Inc.). Impact tests were conducted that included striking the specimens with an impulse hammer. One of the experimental specimens (padding material 10 having a thickness of 6 mm) outperformed the commercial products, whose thicknesses were 12 and 13.5 mm. Another experimental specimen (padding material 10 having a thickness of 11 mm) provided a reduction in peak force greater than up to four layers of the commercial products stacked on top of each other. In fact, when normalized by multiplying the force by the thickness of the tested sample, the padding material 10 performed significantly better per ply than both commercial products.

The padding material 10 is believed to provide a significantly lower magnitude of high strain rate stiffening as compared to closed-cell and open-cell foam materials used as interior padding for many helmets used in sports, and therefore may be incorporated into helmets to reduce head acceleration and impact energy to a wearer's head. In impact tests performed with an impulse hammer, when accounting for thickness of the specimen, the padding material 10 outperformed even the best performing football helmet padding across all impulse ranges.

In view of the above, the padding materials 10 described herein are believed to provide improved energy absorption capabilities over conventional protective equipment padding. The specimens of the padding material 10 were believed to absorb impacts by compressing faster and more completely than the tested commercially products, in part due to the interphase between the substrate 14 and the polymeric material of the unit cells 12, the spacing between unit cells 12, and the fine porosity within the polymeric material.

Any of the above-describe padding materials 10 and protective products into which they are incorporated could further include embedded sensors or features intended to provide information regarding the padding materials 10. For example, the unit cells 12 may include wear indicators such as layers of different colors that indicate wear and tear over time, or otherwise indicate a need for replacement. Embedded strain gauges within the unit cells 12 may be used to measure deformation. Accelerometers may be included within the padding material 10 to measure acceleration events in specific locations on the body. These may also help measure relative motion and understand the biomechanics of the wearer, or provide useful data if the padding material 10 is incorporated into a floorboard or wall of a military vehicle.

While the invention has been described in terms of specific or particular embodiment and investigations, it should be apparent that alternatives could be adopted by one skilled in the art. For example, the padding material 10, its components, and products comprising the padding material 10 could differ in appearance and construction from the embodiments described herein and shown in the drawings, functions of certain components of the padding material 10 could be performed by components of different construction but capable of a similar (though not necessarily equivalent) function, and appropriate materials could be substituted for those noted. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the claims.

The invention claimed is:

1. A protective product that is a structural component comprising:
   a padding material comprising:
      a base and an array of raised unit cells that individually protrude from a surface of the base so that the unit cells are spaced apart from each other, the base and the unit cells being formed of a cured polymeric material that contains fine porosity having pore sizes on a microscopic scale between about 0.1 micrometers and about 100 micrometers; and
      a substrate formed of a textile or fabric material that is embedded in the base and permeated by the cured polymeric material;
   first and second plates that define a closed cavity therebetween in which the padding material is contained;
   voids within the closed cavity and defined by spaces between adjacent unit cells, wherein the spaces defining the voids are located outside of the cured polymeric material that forms the base and the unit cells of the padding material; and
   a liquid within the closed cavity and in which the raised unit cells of the padding material are immersed, wherein the liquid fills the voids, and wherein flow of the liquid between the first and second plates dissipates energy of a shock wave from an impact on at least one of the first and second plates.

2. The protective product of claim 1, wherein the substrate is a woven fabric.

3. The protective product of claim 1, wherein the substrate is a non-woven polymer material.

4. The protective product of claim 1, wherein the substrate is a woven polymer material.

5. The protective product of claim 1, wherein the polymeric material is a composite viscoelastic polymer whose stiffness is tailored with at least one additive, and wherein the polymeric material comprises a plurality of activators including a ratio-based mix of a fast-curing activator and a slow-curing activator that individually achieve relatively faster and slower curing rates, respectively.

6. The protective product of claim 5, wherein the viscoelastic polymer is silicone and the at least one additive includes at least graphite.

7. The protective product of claim 1, further comprising an adhesive on a surface of the base opposite the unit cells.

8. The protective product of claim 1, further comprising a wear indicator incorporated into at least some of the unit cells.

9. The protective product of claim 1, further comprising a sensor incorporated into the padding material.

10. The protective product of claim 1, wherein the protective product is a protective garment, gear, or equipment used in a sporting activity.

11. The protective product of claim 1, wherein the protective product is a surface of a sporting equipment.

12. The protective product of claim 1, wherein the protective product is a playing surface for a sporting activity.

13. The protective product of claim 1, wherein the protective product is a roll bar or cage in a passenger vehicle.

14. The protective product of claim 1, wherein the protective product is a cushioning layer on a floor, cabinet, door, doorframe, doorknob, wall, or gate.

15. The protective product of claim 1, further comprising columns or struts extending from the first plate to the second plate and between adjacent unit cells of the padding material.

16. The protective product of claim 1, further comprising a sidewall that encloses the closed cavity between the plates and is formed of a material that is permeable to the fluid.

17. A method of producing the padding material of the protective product of claim 1, the method comprising:
   providing a mold having at least first and second components;

filling recesses in the first component with an uncured polymer material;

locating the substrate of the textile or fabric material over the recesses of the first component such that the substrate overlies the uncured polymer material;

assembling the first component with the second component to enclose the uncured polymeric material and the substrate;

generating a vacuum through the second component such that a first portion of the uncured polymer material is siphoned from the recesses in the first component and into the substrate; and curing the uncured polymer material to form the cured polymeric material that is integrated into and permeates the substrate, and a second portion of the uncured polymer material remains in the recesses so that the cured polymeric material also defines the array of raised unit cells that protrude from the surface of the base of the padding material.

18. The method of claim 17, wherein the uncured polymeric material contains at least two activators that cure the uncured polymeric material at sufficiently different rates to produce the fine porosity and also a coarse porosity within the cured polymeric material.

19. The method of claim 17, wherein the cured polymeric material is a composite viscoelastic polymer whose stiffness is tailored with at least one additive.

20. The method of claim 19, wherein the viscoelastic polymer is silicone and the at least one additive includes at least graphite.

* * * * *